United States Patent
Nutsos

(10) Patent No.: US 8,323,385 B2
(45) Date of Patent: Dec. 4, 2012

(54) CONDUCTING AIR FILTER AND FILTER ASSEMBLY

(76) Inventor: Mikael Nutsos, Tullinge (SE)

( * ) Notice: Subject to any disclaimer, the term of this patent is extended or adjusted under 35 U.S.C. 154(b) by 555 days.

(21) Appl. No.: 12/549,114

(22) Filed: Aug. 27, 2009

(65) Prior Publication Data

US 2010/0024653 A1 Feb. 4, 2010

Related U.S. Application Data

(63) Continuation-in-part of application No. 10/554,752, filed as application No. PCT/SE2004/000668 on Apr. 29, 2004, now Pat. No. 7,594,959.

(30) Foreign Application Priority Data

Apr. 30, 2003 (SE) ........................... 0301283

(51) Int. Cl.
*B03C 3/45* (2006.01)
(52) U.S. Cl. .................... 96/15; 55/528; 96/98
(58) Field of Classification Search .......... 96/15, 69, 96/96–100, 95; 95/59, 57; 204/157.3; 55/DIG. 39, 55/524, 527, 528
See application file for complete search history.

(56) References Cited

U.S. PATENT DOCUMENTS

| | | | |
|---|---|---|---|
| 3,768,233 A | * | 10/1973 | Mateson ........................ 96/1 |
| 3,783,588 A | * | 1/1974 | Hudis ........................... 96/58 |
| 3,798,879 A | | 3/1974 | Schmidt-Burbach et al. |
| 4,244,710 A | | 1/1981 | Burger |
| 4,354,861 A | | 10/1982 | Kalt |
| 4,615,829 A | | 10/1986 | Tamura et al. |
| 4,662,903 A | | 5/1987 | Yanagawa |
| 4,955,991 A | | 9/1990 | Torok et al. |
| 4,976,752 A | | 12/1990 | Torok et al. |
| 5,358,556 A | | 10/1994 | Kaner et al. |

(Continued)

FOREIGN PATENT DOCUMENTS

DE 19916802 10/2001

(Continued)

OTHER PUBLICATIONS

European Patent Office Communication, dated Jul. 10, 2009 and issued in corresponding European Patent Application No. 04 730 399.5-2113.

(Continued)

*Primary Examiner* — Richard L Chiesa
(74) *Attorney, Agent, or Firm* — Young & Thompson

(57) ABSTRACT

A conducting filter adapted for removing airborne particles from the atmosphere and a filter assembly including such a filter. The conducting filter is made from a polymer which has received significantly increased electrical conductivity by a doping process, the doped polymer referred to as a synthetic metal, the synthetic metal having electrical properties such that the filter according to the invention, including such polymer, may be supplied with electrical charge and whereby maintain its efficiency with regards to the electrostatic properties during operation. In the filter assembly according to the invention, the conducting filter may be supplied with electrical charge by connecting it to a voltage source.

6 Claims, 3 Drawing Sheets

U.S. PATENT DOCUMENTS

Figure 1A:
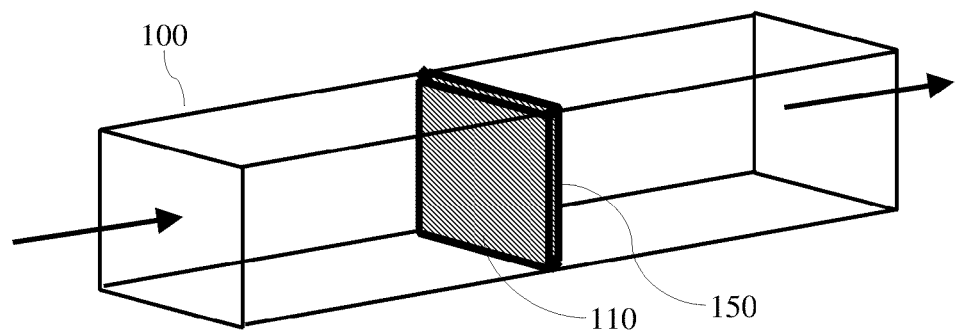

| | | | |
|---|---|---|---|
| 5,368,635 A | | 11/1994 | Yamamoto |
| 5,492,551 A | * | 2/1996 | Wolfe ............................... 55/496 |
| 5,567,356 A | | 10/1996 | Kinlen |
| 5,578,113 A | * | 11/1996 | Glenn ............................... 96/52 |
| 5,582,632 A | | 12/1996 | Nohr et al. |
| 5,660,605 A | * | 8/1997 | Chan et al. ........................ 96/19 |
| 5,980,614 A | | 11/1999 | Loreth et al. |
| 6,271,509 B1 | | 8/2001 | Dalton |
| 6,364,935 B1 | | 4/2002 | Wennerstrom |
| 6,512,215 B2 | | 1/2003 | Dalton |
| 6,585,803 B1 | | 7/2003 | Chang et al. |
| 6,888,116 B2 | | 5/2005 | Dalton |
| 7,004,995 B2 | * | 2/2006 | Schroder et al. ................. 95/59 |
| 7,594,959 B2 | * | 9/2009 | Nutsos ............................. 96/69 |
| 2002/0036201 A1 | | 3/2002 | Dalton |

FOREIGN PATENT DOCUMENTS

| | | |
|---|---|---|
| EP | 0 577 406 A1 | 1/1994 |
| JP | 62-075846 U | 5/1987 |
| JP | 8-108092 A | 4/1996 |
| JP | 9-024297 A | 1/1997 |
| JP | 2003-113262 A | 4/2003 |
| WO | WO 9805044 | 2/1998 |
| WO | WO 02074416 | 9/2002 |

OTHER PUBLICATIONS

English translation of Japanese Office Action, dated Aug. 4, 2009.

* cited by examiner

CONDUCTING AIR FILTER AND FILTER ASSEMBLY

CROSS REFERENCE TO RELATED APPLICATION

This application is a continuation-in-part of U.S. application Ser. No. 10/554,752 (now U.S. Pat. No. 7,594,959) filed on Mar. 14, 2006 as the 35 USC 371 national stage of international application PCT/SE2004/000668 filed on Apr. 29, 2004, which claimed priority to Swedish application SE 0301283-8 filed on Apr. 30, 2003. The entire contents of each of these applications is hereby expressly incorporated by reference.

FIELD OF INVENTION

Present invention relates to an electrostatic air filter and an air filter assembly comprising such filter. In particular the invention relates to a filter, adapted to remove particles from the atmosphere, that can be continuously supplied with charge to increase its efficiency in collecting and retaining charged airborne particles.

BACKGROUND OF THE INVENTION

The need for effective air purification is ever increasing. The need is evident in providing a healthy home environment and comfortable conditions in offices and vehicles, and also in creating clean room environments for advanced production and research.

In existing systems for filtering of air, particularly in larger buildings, the air purification is often combined with ventilation systems. The air that is forced into the building is typically made to pass through one or more filters with the purpose of reducing the amount of particles in the air. The air filters are normally divided into three classes: coarse filter, high efficiency filter and micro filter (or High Efficiency Particulate Air (HEPA) filter). Coarse and high efficiency filters are often used in combination and can be made to be effective in blocking particles of a size larger than 1 μm. However, a significant portion of the air pollution comprises of particles with sizes below 1 μm, and among these are substances that has been shown to be of importance regarding health aspects. Furthermore, in clean rooms, the requirements concerning the size of particles and their concentrations are significantly harder than what can be provided with the combination of coarse and high efficiency filters only. To effectively filter out particles smaller than 1 μm, commonly used techniques comprises the uses of one or more micro filters. The micro filters are comprised of materials of extremely fine fibers giving very large active area of the filter. The term "density" is a measure of the level of filtering. It is possibly to obtain high degrees of filtering using micro filters. However, these filters are typically expensive and due to their high density they often have a short lifetime. Hence, the micro filters need to be frequently replaced, which result in high maintenance costs. Additionally, due to their high density, the micro filters cause a large pressure drop, not at least than the filters are starting to get clogged. This results in a lower air flow and a deterioration of the ventilation if the filters are not frequently exchanged. Alternatively, the fans of the ventilation system need to work harder, which gives higher cost of operation and often an increase in noise. Accordingly, although technically possible, it is costly and cumbersome to achieve and maintain a high degree of air purification using micro filters and at the same time provide a sufficient ventilation.

The above described filters are functioning through their density only. Other principles of purging air is known in the art. Among the known principles are the use of electrostatic filters. These filters have in combination to having a high density, also been provided with a electrostatic charge in order to attract charged air particles (see for example www-.camfil.se). The material in the electrostatic filters are good insulators, for example polymers, and the filter gets the electrostatic charge during the manufacturing or mechanical machining of the filter, for example.

Electrostatic filters can be effective, but their electrostatic charge is often relatively quickly neutralized by particles of opposite charge which are caught in the filter, which leads to a deterioration in efficiency of the filters. Further, the filters are typically sensitive to moisture in the air, which will lower the electrostatic charge of the filters. In practice, then used in realistic conditions, the electrostatic filters typically have lost a significant part of their capacity already after a couple of weeks.

Electric charge is used also in air purification using so-called ionizers. Ionizers transfers charge in the form of electrons to airborne particles and molecules. These negatively charged particles can more easily agglomerate to larger particles which can be made to attract to a positive part of the ionizer. Alternatively high efficiency or micro filters are used to collect the agglomerated particles. Similarly, positive airborne particles can be made. The efficiency of the filters can be increased further if the filters are given an electrostatic charge. If high voltage ion emitters are utilized, actual ionization of the surrounding gas (air) occur due to so called corona discharge. The so-created ions collide with and stick to the airborne particles. Depending on the potential of the emitter, positive or negative ions may be created. Such filter and filtering systems are commercially available from Transjonic AB, for example.

Transjonic discloses an arrangement for air purification intended to supplement or replace a conventional air purification in a ventilation system. One or more ion emitters are placed in an air duct for the incoming air stream, close to a filter package. An improved air purification is achieved both due to that small particles agglomerates more easily to larger entities which can be caught by a high efficiency filter, for example, and due to electrostatic effects in the filters. However, the electrostatic filters have the same shortcomings as described above, i.e. the electrostatic filters lose their charge during operation and hence, lose some of their filtering capability.

Accordingly, a problem with the prior art techniques is that arrangements comprising electrostatic filters lose capacity due to that the electrostatic charge of the filters decrease during operation.

SUMMARY OF THE INVENTION

One object of the present invention is to provide filters which can be provided with electrostatic charge during operation, whereby increasing their capacity in trapping charged airborne particles.

This is achieved with the filter and filter assembly according to the invention as recited in the claims.

Thanks to that the filter according to the invention comprises polymer that has obtained substantially increased conductivity by a doping process, may the filter according to the invention be supplied with electric charge during operation and whereby maintain the capability to attract charged airborne particles.

The filter according to the invention is preferably manufactured from a synthetic metal, for example based on one of the following materials, combinations of some of the following materials, or derivatives of the following materials: polyacetylen, polyaniline, cis-polyacetylen, Polypyrrole, poly-ethylenedioxythiophene (PEDOT), poly(phenylene vinylidene), Poly(thiophene) or poly (dialkylfluorene).

The filter assembly according to the invention utilizes the conducting filter described above. Air is governed through the filter arrangement, wherein the conducting filter is in connection with a first electrical potential and hence receiving has an electric charge. Preferably the filter arrangement comprises of at least a second conducting filter which has received an electric charge which is opposite that of the first filter. Preferably, the first and second conducting filters are so arranged as to constitute an electrical capacitor, whereby ensuring an even charge distribution over the filter surfaces.

One advantage afforded by the present invention is that the conducting filter may be supplied with charge during operation, either continuously or on demand.

A further advantage afforded by the present invention is that the conducting filters may be arranged in an arrangement giving a condition similar to a capacitor.

BRIEF DESCRIPTION OF THE FIGURES

FIG. 1*a-b* illustrate a filter arrangement according to the invention comprising a conducting filter according to the invention;

FIG. 2 illustrates a filter assembly according to one embodiment of the invention comprising two conducting filters according to the invention;

FIG. 3 illustrates a filter assembly of the type forming a capacitor according to one embodiment of the invention;

FIG. 4 illustrates a filter assembly of the type forming a capacitor according to one embodiment of the invention;

FIG. 5 illustrates a filter assembly of the type forming an elongated capacitor according to one embodiment of the invention;

FIG. 6 illustrates a filter assembly of the type according to an embodiment of the invention used in combination with an ion emitter; and FIG. 7 illustrates a conducting thin film air purifier according to the invention mounted on a glass window.

DETAILED DESCRIPTION OF THE INVENTION

The embodiments of the present invention will be described primarily in the context of air purification, in particular to using the filter and filter assembly according to the invention to remove airborne particles from air. As appreciated by those skilled in the art the filters can equally well be used for purification of other gases, gases mixtures and certain liquids.

One aspect of the present invention may, on a conceptual level, be described as replacing the known isolating electrostatic filters with filters of a conducting material, which conducting filters are given an electric charge by connecting the filter to a high voltage source.

Up to now, filters with sufficiently high conductivity to function as outlined above, have only been possible to manufacture in metal, or with a high degree of metal in a metal/insulator combination. Metallic filters have not been possible to manufacture with the high density that is needed to achieve the higher levels of air purification. Recently a new group of materials have emerged, the so called "synthetic metals". Synthetic metals comprises of polymers which has received charge carriers by a process that is similar to the doping of semiconductors. Therefore, synthetic metals are also referred to as "doped". The polymers may be n- or p-doped, either chemically or electronically, to a state which can be characterized as metallic. A large variety of polymers have in this manner been transformed into becoming conductors, with a large span in conductivity. Doped polyacetylene and polyaniline are known examples of synthetic metals. Also cis-polyacetylene, polypyrrole, poly(thiophene) (and derivatives thereof), poly(phenylene vinylidene), poly(ethylenedioxythiophene) (PEDOT), polyfenylenvinyliden), polydialkylfluorene), for example have been shown to give high conductivity with doping. Synthetic metals has been described in the art that exhibit conductivity up around $10^5$ S/cm, which is a good conductor and equivalent to a number of metals such as some iron alloys. A comprehensive study of common synthetic metals and their electric properties is given in "Synthetic metals: a novel role for organic polymers" by A. G. MacDiarmid, Current Applied Physics 1, 2001, 269-279.

Generally as high conductivity as possible is preferable in an electrostatic conducting filter arrangement according to the invention. However, the absolute value of the conductivity is not critical and a conductivity equivalent to that of a semiconductor could in many applications suffice. Preferably, the conductivity of the conducting filter should be above 10 S/cm and even more preferably above $10^2$ S/cm. The filter material's applicability with regards to other properties than the electrical should also be considered, for example mechanical and chemical properties. In addition, the cost of production is also of importance, considering the relatively large amounts of the material needed in a ventilation system, for example.

The above mentioned synthetic metals should be appreciated as examples, and the invention should not be considered as limited to these materials. In the present application the term "synthetic metal" is to be interpreted as an polymer which through a doping process, or a process similar to doping, has been given a substantially increased conductivity.

Among the large variety of synthetic metals which have been reported a large portion also have mechanical and chemical properties that make them suitable as filter materials. It is in this aspect the materials typical polymer characteristics that is utilized, for example the possibility of fabricating very thin fibres of the material (some μm), which in many cases can be made to curl during the manufacturing process to give a filter with high density and a very large effective surface area. Some of the polymers, which have been shown to be possible to dope and "transform" into a synthetic metal, are polymers that today are used in filters (in their un-doped, non-metallic form), for example polyethylene, polyaniline, polypropylene and polyacetylene. These materials are in their un-doped forms well known and well suited for filter applications, for example with regards to their mechanical properties. In addition several production methods are known and used to effectively produce air filters using these polymers. The recently discovered possibility of making these normally highly insulating materials, conductive, makes polyethylene, polyaniline, polypropylene and polyacetylene, for example, particularly well suited to be used in a conducting filter according to the present invention.

A number of methods are used to manufacture synthetic high efficiency and micro filters. Most of these methods may with only minor adaptations, if any, by used also in the manufacturing of conducting filters. Suitable methods include, but are not limited to: air-laid material, wherein ready-made fibers are blown into an air-stream to form a continuous web; meltblown processes, wherein melted polymers are extruded in an high-temperature, high-velocity air-stream, which results in very thin fibers; and flash-spun processes also capable of producing very thin fibers.

The conducting filter according to the invention is supplied with electrical charge by that it is connected to a high DC-voltage, preferably a high voltage source of conventional type. Suitable voltage will depend on the electrical properties of the filter material and the required efficiency of the filter. Typically, a voltage of 10-100 kV is suitable. The to the filter supplied charge causes the charged airborne particle to be trapped and held by the filter due to the same mechanisms as in the conventional electrostatic filters. As the conducting filter according to the invention may be supplied with electrical charge, either continuously or then needed, by the connection to the voltage source, the conducting filters will not lose their charge during operation. By choosing polarity from the voltage source, the conducting filter can be given either positive or negative charge, which constitute an advantage of the inventive filter as the same type of filter can be used to attract both positively- and negatively-charged airborne particles. In fact, the very same filter can be made to have different charge at different times, which could be used to adapt the filter to variations in the air pollution. Filter components with different charge can be made to interact to further enhance the filtering efficiency, which will be further exemplified below.

If the voltage is cut-off, the charge of the conducting filter will remain during a time period, but the charge will decrease due to discharges. The filter will eventually lose its electrostatic properties. Preferably, the conducting filter is a high efficiency or micro filter, with regards to its conventional filtering properties, so that a vast majority of the particles collected in the filter will remain. Upon switching on the voltage the filter will regain its electrostatic properties.

The conducting filter according to the invention may be formed in any of the shapes and designs commonly used for air filters, for example panel (flat) filters, bag filters and pleat filters.

Figure 1B:
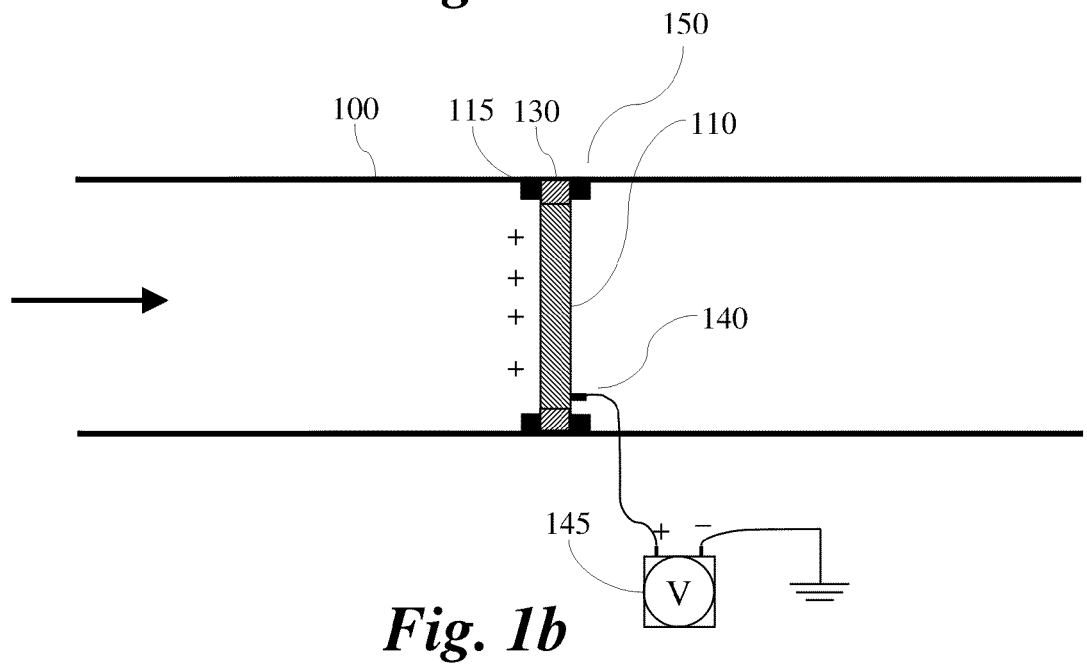

In a first embodiment of the invention the conducting filter, connected to a high voltage source may be described as replacing an existing filter or filter package in a ventilation system, for example. FIG. 1a-b shows an air duct for incoming air 100 in a ventilation system, 1a in a perspective view and 1b in a partly cross-sectional view. A flow of incoming air is provided with the use of a fan, or fans (not shown). The direction of the airflow is indicated with arrows. The fan is placed either before or after a conducting filter 110, with regards to the direction of the airflow. Preferably, the conducting filter 110 is provided in one of the standardized dimension and with the standardized means for attachment which are commonly used in the trade. Preferably the filter constitute of a number of bags in order to increase the effective surface area. Alternatively the filter may be of the pleat-type. The conducting filter 110 must be electrically isolated from its surroundings in order to maintain its charge. Otherwise the charge would transported away by the usually electrically conductive materials, e.g. steel plate, used in the cover of the air duct and/or in the fixture of the conducting filter 110.

Preferably, the conducting filter 110 is mounted in a frame 130 made of insulating material. Preferably the isolating frame 130 also constitutes the mechanically supporting element of the filter and optionally provides fixtures adapted to engage with fixture means 115 of the air duct. The filter is provided with an electrical contact 140 to be connected to a high voltage source 145 via a cable. One or more conducting filter 110, the frame 130, fixtures and possibly other elements such as seals, supporting rims are included in a filter assembly 150. The high voltage source 145 is preferably located outside of the air duct 100 and an electrical through-connection is provided through the cover of the air duct to connect to the electrical contact 140 of the filter. The conducting filter may be held at either a positive or a negative potential. Preferably, the pole of the high voltage source 145 which is not in use is grounded.

Figure 2:
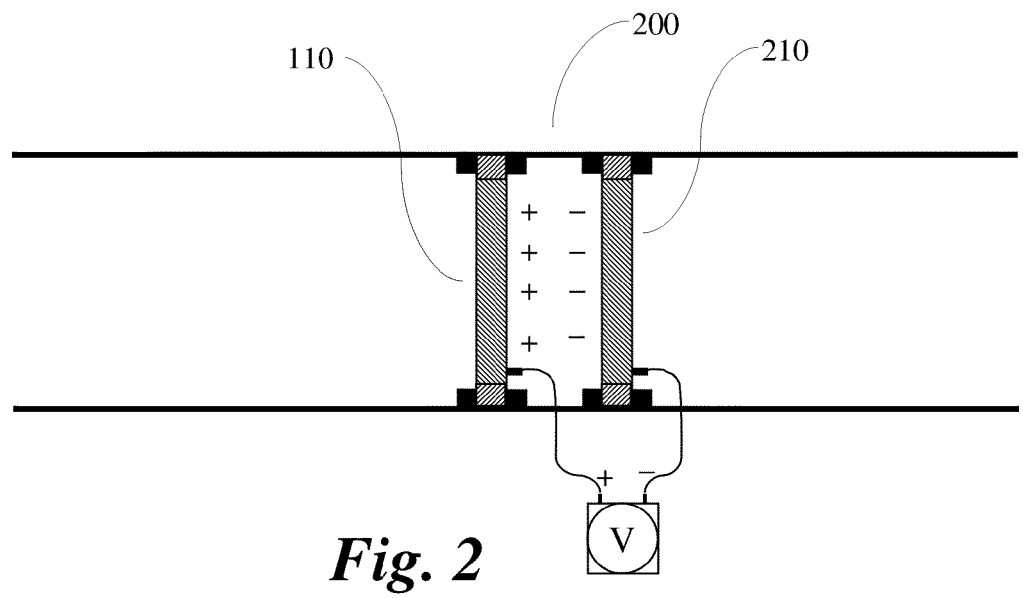

The charged conducting filter is most effective for particles of the opposite charge. The efficiency of a filter arrangement can be increased by the use of a further conducting filter. One embodiment of the invention using two or more conducting filters is shown in FIG. 2. A second conducting filter 210 is arranged after the first conducting filter 110, with regards to the direction of the airflow. The two filters are given opposite electric charge, by supplying the first conducting filter 110 with a negative potential and the second conducting filter 210 with a positive potential or vice versa. The filter arrangement according to this embodiment exhibit an additional advantage in that an even charge distribution over the surfaces of the filters is more easily achievable compared to the single conducting filter arrangement. This can be understood by considering the charged single conducting filter of FIG. 1. In this configuration the conducting filter is held at a high potential and the surrounding (conducting) cover is typically grounded, as would be the case in a ventilation system in a building. The free charges in the filter will typically accumulate in portions of the filter which are closest to a grounded surface, for example along the edges of the filter. Accordingly, an uneven charge distribution may occur. The uneven charge distribution can be mitigated by careful design of the filter and the air duct, for example utilizing a non-conductive material for the air duct.

In certain application a more even charge distribution would be preferably. In the embodiment illustrated in FIG. 2 an even charge distribution is achieved by adapting the distance between the first and second filter so that the filters have an electrostatic effect on each other. Similar to the charge distribution condition in a typical plate capacitor, the charges in the first conducting filter 110 will be essentially evenly distributed over the surface of the filter facing the second conducting filter 210, and vice versa. In addition to giving a better charge distribution, the supplied high voltage does in this arrangement not need to be as high as in the case with single conducting filter, which is advantageous both in the light of the cost of operation and from security aspects. Filter arrangement utilizing an effect similar to that in an electric capacitor will in the following be referred to as "capacitor filter".

Figure 3:
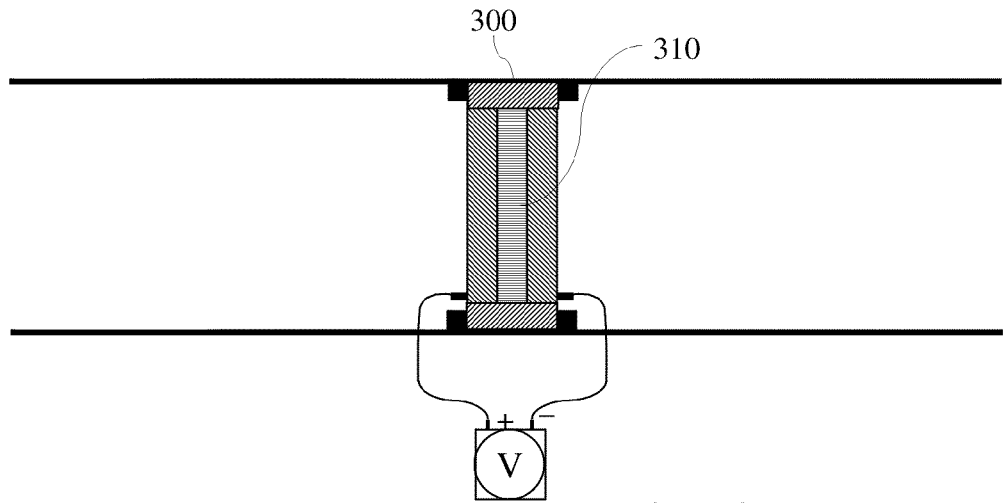

The use of the capacitor effects is further developed in a further embodiment of the present invention, which will be described with reference to FIG. 3. In this embodiment the two conducting filters are combined into a filter assembly 300. The first and second conducting filters are separated by a separating member 310, the separating member 310 being an isolator and with high permeability to air. Preferably, the separating member has a design and is made of a material so that it contributes to the mechanical filtering properties of the filter assembly 300. Suitable materials include polymers in their un-doped isolating forms.

The thickness of the separating member 310 is preferably adapted to the isolating properties, intended voltage difference between the conducting filters, intended density of charge carriers, and the intended use of the filter assembly. Disrupted discharges should be avoided and if the filter assembly is to be used in an environment with a high degree of moisture, a thicker, or alternatively better insulating, separating member 310 should be considered. The filter assembly may be extended with a plurality of pairs of filters arranged after each other with regards to the direction of the flow of air. Whereby, the air is passed through a plurality of capacitor filters.

Figure 4:
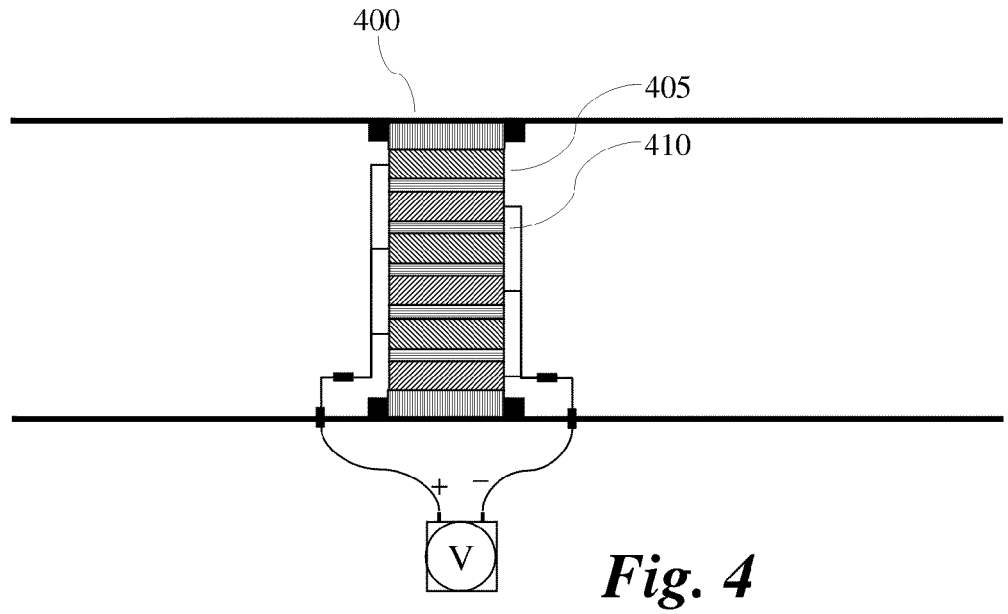

In an alternative embodiment, described with reference to FIG. 4, the filter plates in the filter assembly 400 are orientated so that their greater planes are essentially parallel with the main direction of the flow of air. Arranged between each conducting filter 405 is a separating member, which preferably is made of a high efficiency filter material. In the filter assembly 400, subsequent filters are given opposite charge, i.e. connected to different poles of the high voltage source, for example. This is schematically illustrated in FIG. 4. In that way adjacent pairs of filter receive opposite, but evenly distributed charge.

Pleat-filters commonly have a designed that is well suited to adapt to capacitor filter. A pleat filter comprises of a plurality of rows of tightly pleated filters in connection with each other. A filter assembly of capacitor type can be arranged by making the pleated filters of synthetic metal and the filter rows mounted with isolating material in-between.

Figure 5:
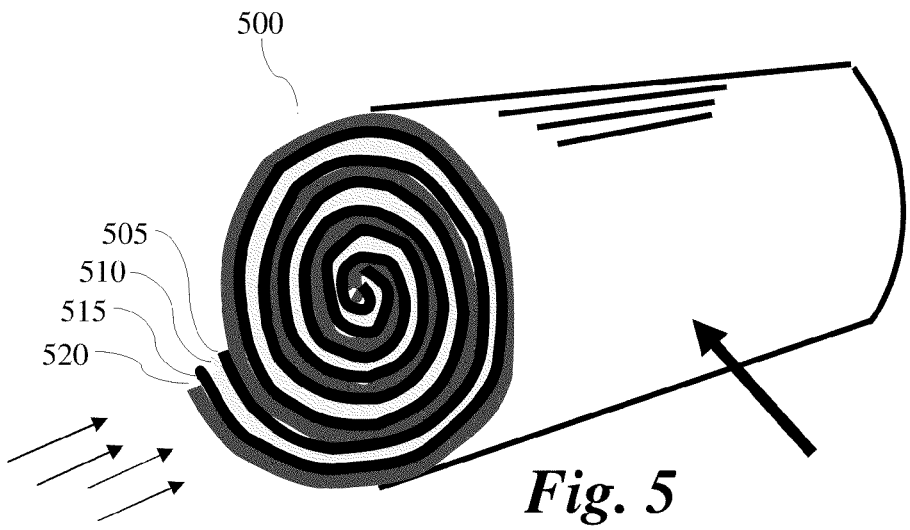

A yet further embodiment of the present invention providing a capacitor filter 500 with very large electrically active surface is illustrated in FIG. 5. To obtain a large surface area of the capacitor filter, similarly to what is known from one type of electrical capacitors, the conducting filters are covered with an insulator and rolled to form a cylinder or folded to form a block.

The filter assembly of this embodiment comprises of a first layer of conductive filter 505, a first layer of isolating filter 510, a second layer of conducting filter 515, and a finishing second layer of insulating filter 520. Preferably, the layers are rolled together to form a cylinder and are held together by the use of adhesive, bands or tape, or put into a mantle. Thus, a capacitor filter with a very large active surface area can be formed. During operation the conducting layers 505 and 515, respectively, are connected to high voltage(s) of opposite polarity. The filter assembly according to this embodiment can be used either with the direction of the flow of air essentially parallel with the length of the cylinder, i.e. perpendicular to the circular cross-section of the cylinder (indicated by a plurality of thin arrows in FIG. 5), or in an direction essentially perpendicular to the envelope surface of the cylinder (indicated by a thick arrow). If the layers of filters instead are folded, other cross-sectional forms can be formed, for example quadratic or rectangular. These shapes can be advantageous if the filter assembly is intended to be used in existing ventilation system, wherein the ducts typically have a quadratic or rectangular cross-section.

Figure 6:
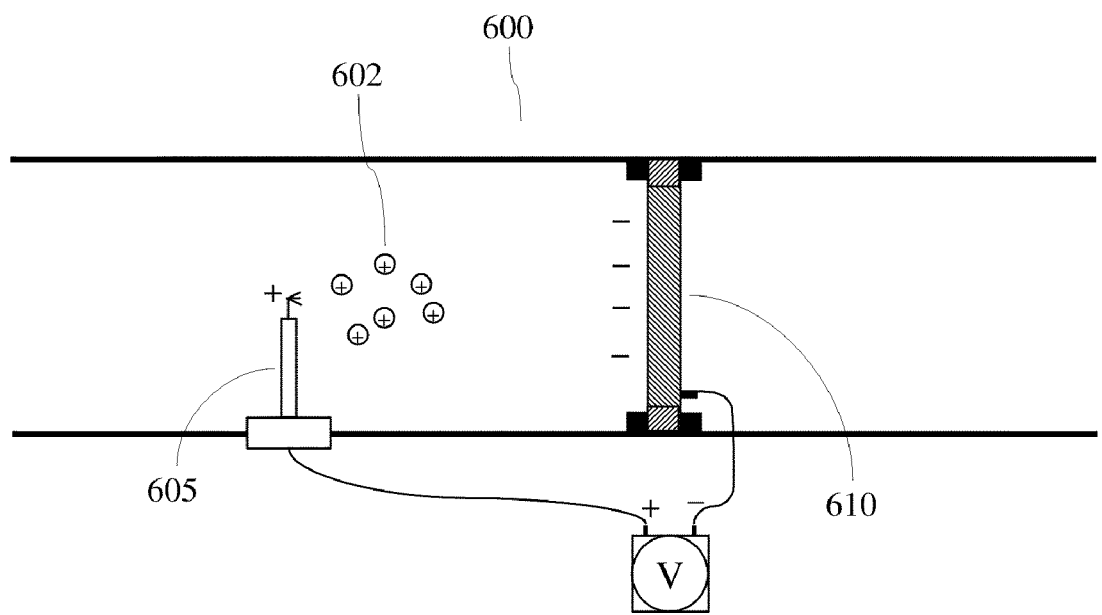

The conducting filter according to the invention may advantageously be used in combination with the previously described devices for transferring charge to airborne particles, the so called ion emitters. Depicted in FIG. 6 is a filter assembly 600 according to one embodiment of the invention utilizing an ion emitter 605, which by corona discharger transfers charge to airborne particles 602, and is located before the conductive filter 610, or conductive filter package, with regards to the direction of the flow of air. Preferably, one pole of the high voltage source is connected to the ion emitter 605 and the other to the conducting filter 610. To further increase the efficiency the filtering system may be provided with a first ion emitter/filter pair with a first charge configuration (for example: ion emitter −, filter +) and a second ion emitter/filter pair with a second charge configuration (ion emitter +, filter −).

The conducting filter, filter assembly and filter systems according to the inventions have here been exemplified in the application of air purification in buildings and specifically in combination with ventilation systems. This should be appreciated as non limiting examples of the use of the invention. As appreciated by the skilled in the art, the conducting filter and filter arrangements according to the invention can be used in a wide variety of filtering and purification applications, including, but not limited to: air purification in vehicles, boats and airplanes; filtering of air in clean-room environments; and filtering of air in engines and machines. The conducting filter may also be effective in the area of filtering combustion fumes. Many of the particles which are created at combustion, for example in a combustion engine, are electrically charged, which makes the conducting filter according to the invention particularly useful in applications wherein the exposure to combustion pollutions are high.

An alternative usage of the conducting filter according to the invention is to form the material into a fabric, preferably a thin fabric, thereby creating a conducting fabric. The conducting fabric of this embodiment may when suitably insulated be used to cover, for example, in a similar manner to wallpaper, or be draped over or suspended from one or more of the surfaces, i.e. the walls and/or floor and/or ceiling and/or windows, or over or from furnishings of a room, for example a clean room, and then be given an electric charge in a similar manner as the conducting filter e.g. by being electrically connected to a high voltage source or by being subjected to microwaves as described below, thereby forming a filter arrangement. Alternatively the fabric may be connected to the ground potential of the building that the room is in. The conducting fabric in the filter arrangement will attract suitably charged airborne particles (that is, particles with the opposite charge) which will stick to the fabric, resulting in that the air is purified from particles. This effect can be described as passive air purification, compared to an active air purification exemplified in the above embodiments, wherein air is forced through a conducting filter. To increase the particle-removing effect one or more ionisers can be provided in the room in order to ensure that airborne particles become charged with a charge which is opposite that of the fabric.

A filter arrangement in accordance with the present invention can additionally or alternatively be provided on furnishings, e.g. on a picture, a screen, a mirror or a portion of a piece of furniture or be in the form of a curtain or screen or the like. The passive air purification of this embodiment may advantageously be combined with above-described active methods. Alternatively the air in a room may be brought into circulation by a simple arrangement of fans, or heating devices such as radiators which cause convection currents, and hence, the efficiency of the conducting drapery or wallpaper or floor or ceiling covering will be increased as more air, and hence more airborne particles, will be brought into contact with its surface. The "drapery" does typically not need to be charged with such high voltage as the filters in the above embodiments since a large area of the active surface is easily accomplished. Typically a voltage under 10 kV, for example 7 kV or less, will suffice and has the advantage that the production of ozone is reduced or avoided. Even voltages as low as 6 V can be used. Preferably, the filter arrangement or "drapery" is given a positive charge since the body of a building has been found to often be positively charged. This positive charge can be achieved by electrically connecting the filter arrangement drapery to the body of the building or the building's earth contact. The user may choose a higher positive potential in order to create a higher potential difference between the negative voltage on the charged particles and the positive charge on the fabric (or the use may choose a high negative voltage to attract positively charged particles) in order to attract the particles to the fabric with a greater force.

As an alternative of the "passive" purification technique the synthetic metals may readily be fabricated as an thin films, which for some polymer can be made to be transparent or semitransparent or may be provided with a decorative pattern. This thin conducting film can be applied to for example one or more windows or wall or other surface or furnishings in a room, and, on being supplied with a potential, function as collectors of charged airborne particles in the manner described above with respect to a conducting fabric.

Figure 7:
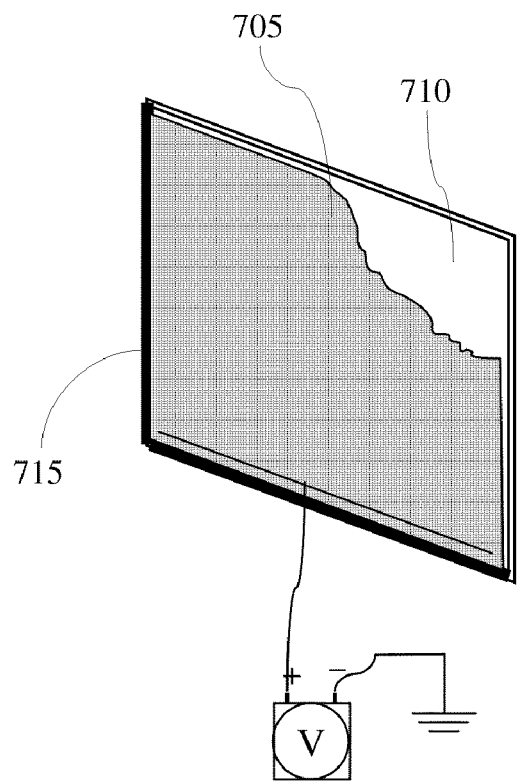

Depicted in FIG. 7 is a preferably thin conducting film or fabric 705 applied to the glass or inward-facing surface 710 of a window 715 or other surface in a room. When used on a window the conducting film or fabric 705 can be connected to a voltage source, typically and preferably at a potential below 100V, or to the ground potential of the building. Suitable potentials range from 6 V to 10000V, with voltages under 7000V preferred. The conducting film or fabric may optionally be combined with a shading layer (not shown) providing a sun block. Alternatively the conducting film or fabric may be semi-transparent, opaque or coloured to provide shading or decorative properties by itself.

In the above described embodiments the conducting filter (and fabric or film) has been described as being supplied with charge by being connected to a voltage DC source. A filter with metallic properties may be supplied with charge in other ways, for example by exposing the conducting filter to microwave radiation. A filter assembly according to an embodiment of the invention using microwaves to charge the filter, may comprise one or more microwave generators adjacent to the conducting filters. Electrical charge is generated in the conducting filters by the radiation from the microwave generator(s). Preferably, the filters and the microwave generators are enclosed in a metallic housing as to prevent the potentially hazardous microwave radiation from exiting the assembly. A suitable metallic housing is typically already provided by the air duct of a ventilation system. Preferably the microwave generators are not operating continuously, rather, the filter assembly should be equipped with a charge measuring device and a control system for starting the microwave generators if the charge of the conducting filter falls below a predetermined value.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An airborne-particle removing filter arrangement, comprising:
a filter material configured to remove airborne particles from the atmosphere, said filter comprised of a polymer material that is conductive and is in the form of a fabric or a film, and said filter material is configured to be applied to one or more of a wall or floor or ceiling or window or furnishing of a room, and/or suspended from the ceiling of a room, and is connectable to an electrical potential in order to receive a first electrical charge.

2. The filter arrangement according to claim 1, wherein said room is provided with an ionizer for ionizing particles in the atmosphere of said room with a second electrical charge which is the opposite of said first electrical charge.

3. The filter arrangement according to claim 1, wherein said polymer material is one of semi-transparent, opaque or colored.

4. An airborne-particle removing filter arrangement, comprising:
a filter material configured to remove airborne particles from the atmosphere, said filter comprised of a conductive polymer material having the form of a fabric or a film,
said filter material configured to be draped over or suspended from a surface of a room,
and said filter material being connectable to an electrical potential thereby to receive a first electrical charge.

5. The filter arrangement according to claim 4, further comprising:
an ionizer configured to ionize particles in the atmosphere of said room with a second electrical charge which is opposite of said first electrical charge.

6. The filter arrangement according to claim 4, wherein said polymer material is one of the group consisting of semi-transparent, opaque and colored.

* * * * *